Jan. 26, 1943.  D. A. GAUTHIER  2,309,386
FUEL CONSUMPTION TESTER FOR AUTOMOBILES AND THE LIKE
Filed Aug. 1, 1940  4 Sheets-Sheet 1

INVENTOR.
DONAT A. GAUTHIER
BY
ATTORNEY.

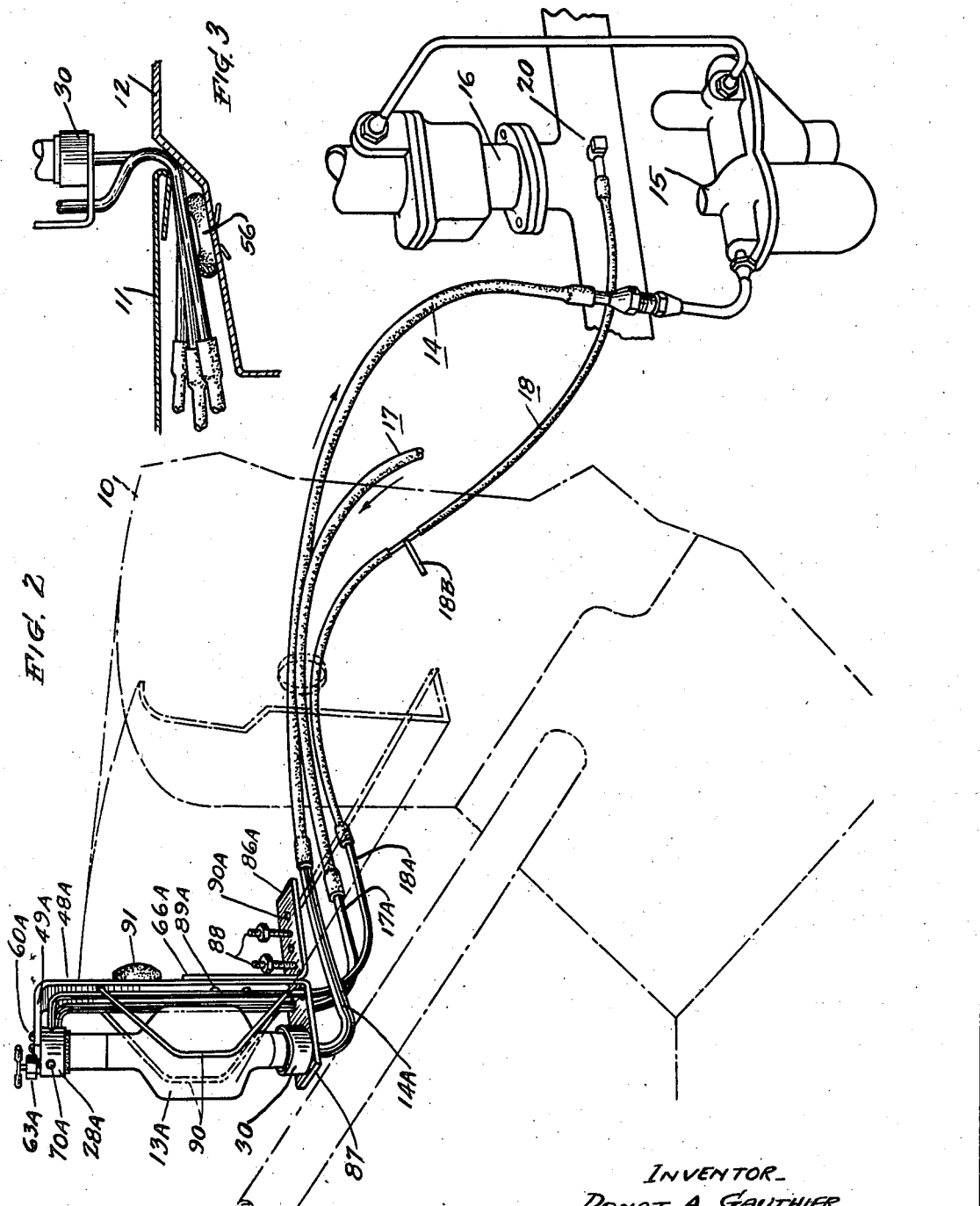

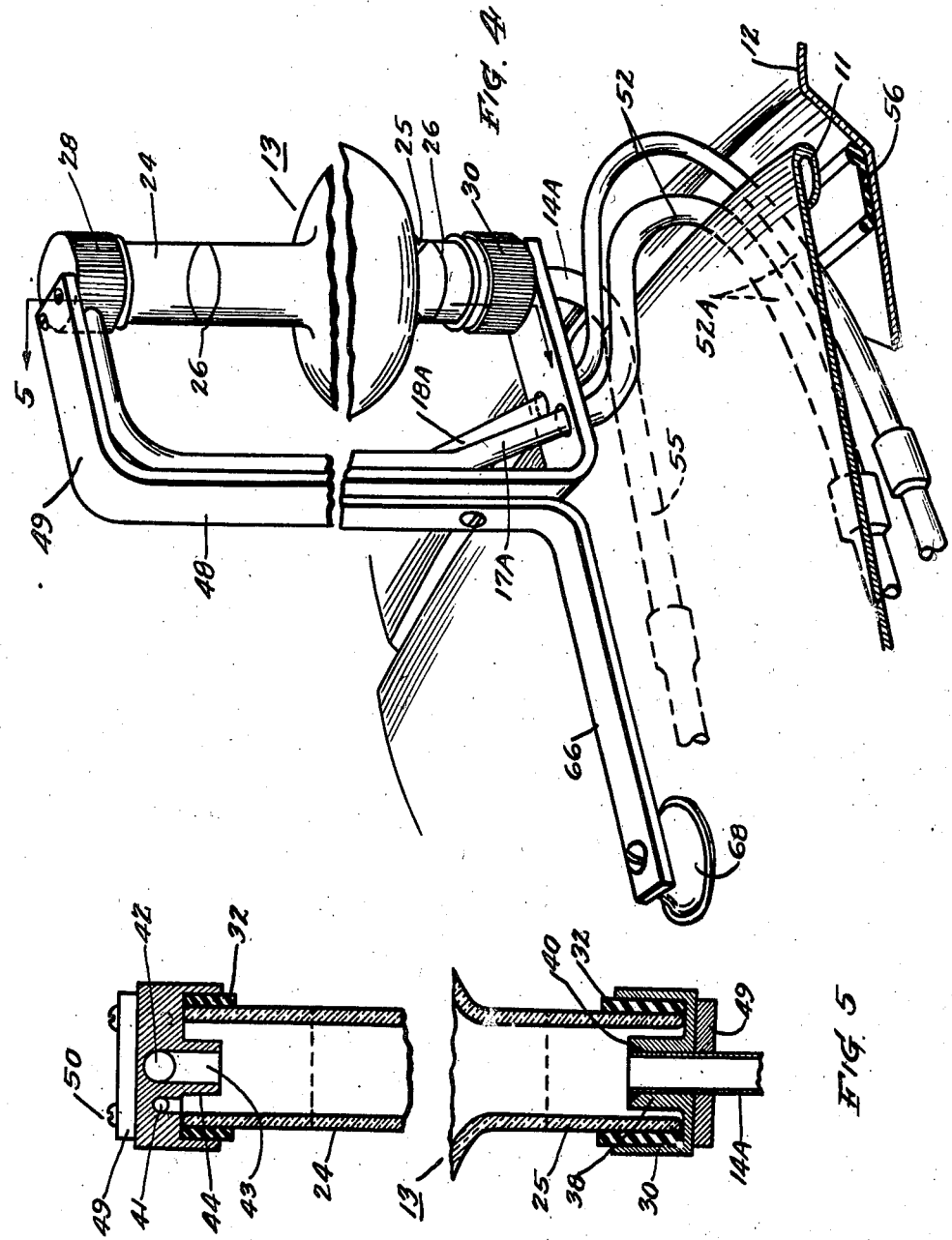

Jan. 26, 1943.                D. A. GAUTHIER                2,309,386
           FUEL CONSUMPTION TESTER FOR AUTOMOBILES AND THE LIKE
                      Filed Aug. 1, 1940         4 Sheets-Sheet 4
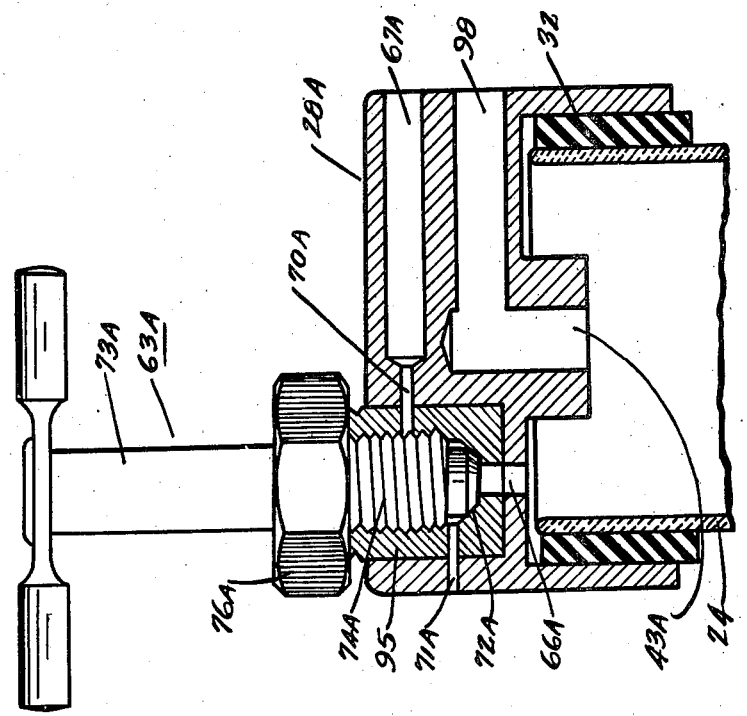
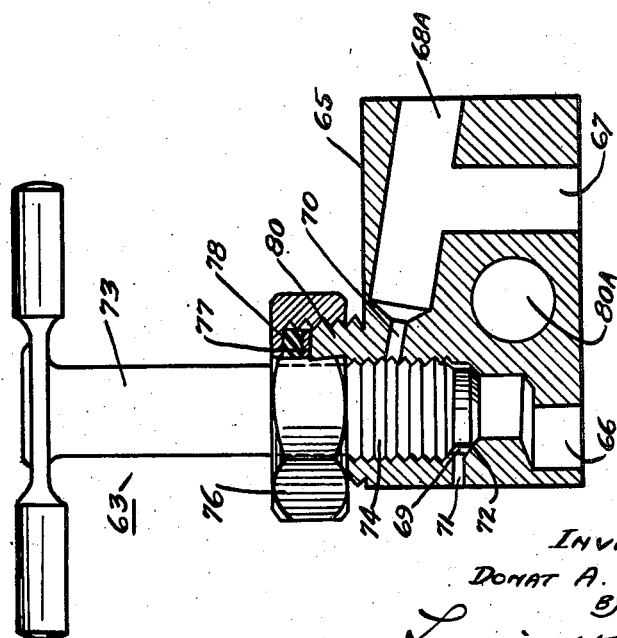
INVENTOR-
DONAT A. GAUTHIER
BY
ATTORNEY.

Patented Jan. 26, 1943

2,309,386

UNITED STATES PATENT OFFICE 2,309,386

FUEL CONSUMPTION TESTER FOR AUTOMOBILES AND THE LIKE

Donat A. Gauthier, Detroit, Mich.

Application August 1, 1940, Serial No. 349,197

11 Claims. (Cl. 73—51)

My invention relates to a fuel consumption tester for automobiles and the like.

More particularly, my invention relates to a device for determining the ratio of mileage to fuel consumption, as for instance, the ratio of miles travelled by an internal combustion engine driven vehicle to the gallon of gasoline consumed.

The device is of the kind wherein a measuring receptacle or burette is used, a determined content of which is evacuated to feed the engine during a test, and the ratio of mileage to consumption is ascertained by dividing the mileage by such determined content.

Among the many objects of the invention, there are the following:

(1) To provide a removable tester of which the burette is disposed outside of the vehicle, as for instance, upon the hood, and in full view of the operator of the vehicle, but having its control or valve within the vehicle, as on the dashboard or adjacent thereto;

(2) To provide a tester capable of easy application to and removal from an automobile having a hinged hood, while being of simple and economical construction;

(3) To provide a tester which will be particularly useful in respect to demonstrators' cars;

(4) To provide a removable tester which will embody a display panel which co-operates in holding the device in operative position when the hood is open;

(5) To provide a tester which will be mounted in operative position on the car without the necessity for drilling holes where they are easily seen, and without otherwise so mutilating the car as to render the use of the tester objectionable;

(6) To provide a tester which will be equally applicable in a fixed position, to remain a permanent part of the car equipment;

(7) To so design the device as to reduce foaming of the fuel within the burette when the same is being replenished or filled preparatory to the running of a test, thus enhancing the accuracy and efficiency of the device;

(8) To so design the device that little fuel inadvertently can be drawn into the engine when replenishing or filling the burette preparatory to the running of a test.

(9) To so design the device that the burette will be waterproof and capable of sustaining the vibrations and shocks occasioned by the operation of the car.

In the drawings, wherein like numerals of reference indicate corresponding parts in the various figures, Figure 1 is an assembly view of a tester made in accordance with my invention, mounted in operative position upon a typical automobile, the tester in the form shown being particularly adaptable for demonstrators' automobiles;

Figure 2 is a similar view to Figure 1, the device taking a slightly different form;

Figure 3 is a section on line 3—3 in Figure 1;

Figure 4 is an enlarged, fragmentary perspective view of Figure 1;

Figure 5 is an enlarged view on line 5—5 in Figure 4;

Figure 6 is a longitudinal section (parts shown in elevation) of the valve used in the form of tester shown in Figure 1;

Figure 7 is a longitudinal section (parts shown in elevation) of the valve used in the form of tester shown in Figure 2.

Figure 1:
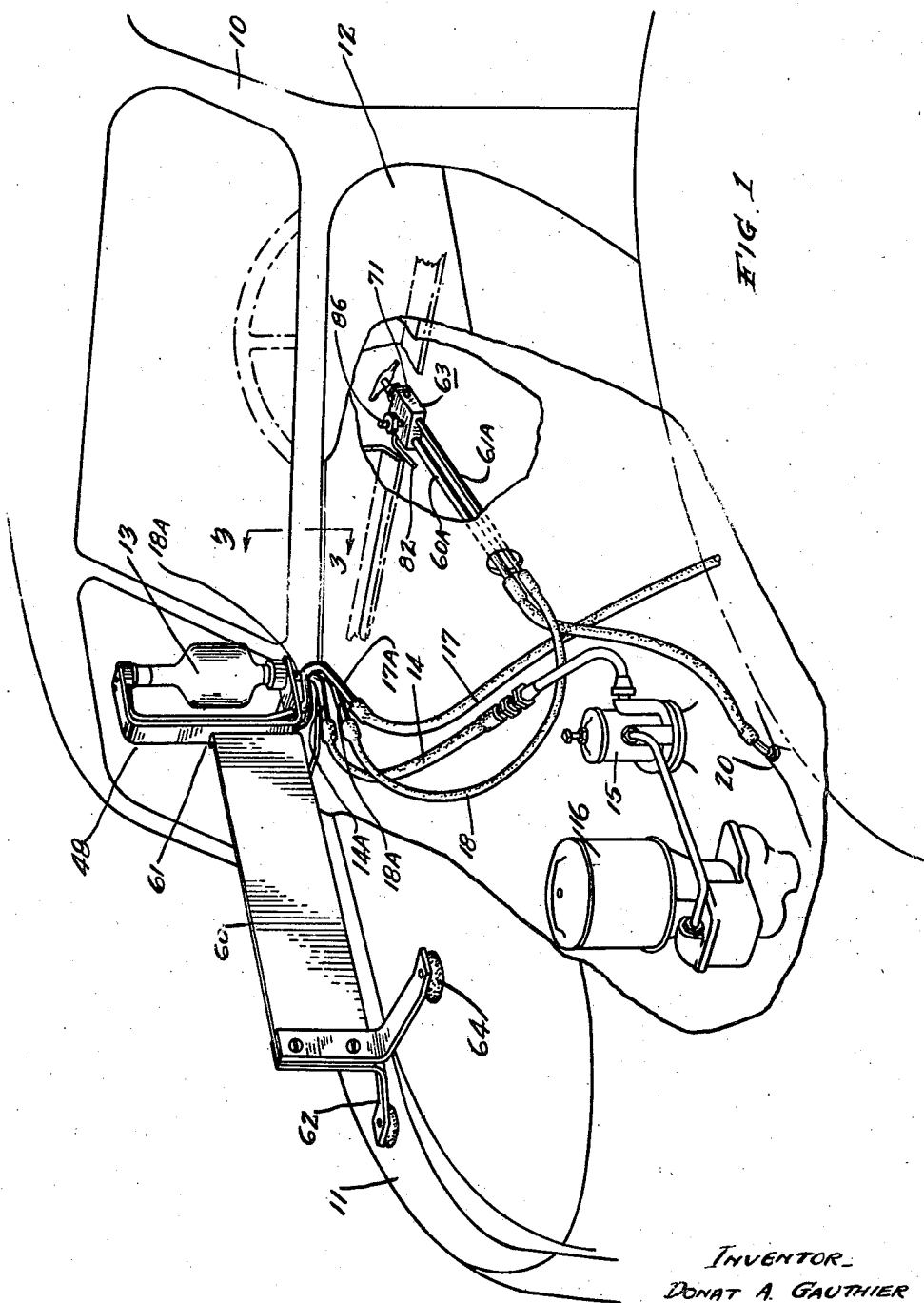

Referring now by numerals to the drawings, 10 is a typical automobile of which 11 is the hood and 12 the cowl. 13 or 13a as the case may be, is a glass receptacle or burette. Opening at one end into the bottom of the burette is a tube or conduit 14 which is operatively connected at its other end to a fuel pump 15. The pump is in turn connected to a carburetor 16 associated with the engine (not shown) of the automobile. The pump is of any approved design functioning to feed fuel into the float chamber of the carburetor, also of approved design, all in accordance with well known practice.

Opening at one end into the top of the burette are two separate tubes or conduits 18 and 17, the tubes being operatively connected at the other end to the intake manifold 20, and to the fuel tank (not shown), respectively. For convenience, the conduits 14, 17, and 18, include rubber hose sections, and metallic sections 14A, 17A, and 18A, respectively. A control valve is used, the function of which is to open the top of the burette to suction obtaining in the manifold, and thus cause fuel from the tank to fill the burette preparatory to the running of a test, and to open the top of the burette to the atmosphere for purposes of running the test. As will be later explained, the control valve used, which has been specially designed, is such that foaming of fuel in the burette is substantially prevented when the same is being filled.

While the tester in one of the two forms shown has been designed to serve primarily as a readily detachable or removable one, which is an important feature in that it is prominently in sight and excites one's curiosity, and thus has a sales-promotion value, it can also be permanently applied to a vehicle when assuming the second form shown. Both forms embody identical operations, and vary unsubstantially only. In both of the forms the burette is substantially the same except that it is convenient and economical to attach the control valve to the burette in the case of the fixed device. In the case of the removable device, the valve is disposed within the body of the vehicle and therefore remote from the burette, and accordingly the burette and valve assume slightly different forms, although their operation and function are still the same.

The burette 13 as shown is formed with upper and lower reduced neck portions 24 and 25, respectively. On each of the neck portions is provided a mark or line 26 which preferably and conveniently may be in the form of a ring cut into the outside surface of the glass and filled with black varnish. The marks 26 are so spaced apart that the volume of the burette as measured between these two marks is equal to a determined arbitrary one—for convenience, say one-tenth of a gallon. Thus, when the level of the fuel in the burette has receded from the upper to the lower mark, a volume of one-tenth of a gallon will have been evacuated out of the burette. If one has observed the mileages indicated on the speedometer when the level was at the upper mark and at the lower mark, respectively, the difference in mileage reading, multiplied by ten, will give a measure of the ratio of mileage to fuel consumption.

To the end of the neck portion 24 of the burette is applied, in a manner presently to be described, a cup-shaped member or closure 28, or 28A, as the case may be, preferably made of metal. A closure 30 is also applied to the end of the neck portion 25 of the burette. That each of the neck portions may form a fluid-tight joint with the members or closures into which it is received, a rubber gasket or ring 32 is compressed between the marginal or side wall of the closure and the wall of the neck, all as best shown in Figures 5 and 7. The tube 14A may be secured to the cup 30 by providing a flange 38 integral with the cup, which is chamfered to receive solder as at 40. The tube is thus rigidly secured to the cup, but may be bodily rotated on the longitudinal axis of the burette, since the cup is capable of turning on the neck of the burette.

In the form of device shown in Figure 1, of which the burette is shown in Figure 5, the tubes 17A and 18A are suitably sized to be inserted into and soldered in apertures 42 and 41 made in the cup 28, to open into the burette. The aperture 42 more particularly opens into a recess 43 in part defined by a boss 44 which extends below the inner face of the cup 28. The burette 13 is preferably assembled to a bracket 48 having two parallel legs 49, the lower of which legs is perforated to receive the tubes 14A, 17A, and 18A, while the upper leg is secured to the cup 28 as with screws 50.

The device, when in the form shown in Figure 1, is easily and conveniently held in operative position by forming the tubes 17A and 18A intermediate of their length substantially as shown in Figure 4. Thus, the two tubes, which run closely and substantially parallel to one another, are bent rearwardly and then forwardly to provide bent or hook portions 52. The end portions 52A are made substantially straight but inclined downwardly, and outwardly with respect to a vertical plane passing through the longitudinal axis of the automobile. The tube 14A is curved to present a substantially straight portion 55 which is also inclined downwardly. As the tube 14A is capable of being rotated bodily on the axis of the burette, it can thus be adjusted so that it also will be directed outwardly with respect to the same vertical plane. When the ends of the tubes 17A and 18A, on the one hand, and the tube 14A, on the other hand, are spaced from one another, or in other words, directed outwardly with respect to one another, and these ends are clamped between the cowl and the closed hood, with the hook portions 52 of the tubes engaging, where possible, the edge of the hood, the burette is held securely in upright, operative position.

In the model of automobile shown, the hood is hinged to the cowl at its body or windshield end, the two hinges being disposed adjacent the sides of the automobile, that is, spaced from the centre of the hood. If the hood is made of sheet metal, it gives or bends at the centre to thus accommodate the tubes by clamping the same against the cowl and holding the same by friction. Usually, a flexible rubber strip 56 is riveted to the cowl, under the edge of the hood, and this strip further increases the friction between cowl and tubes. The tester, in the form shown in Figure 1, is also adapted to be removably secured to automobiles of the types wherein the hood is hinged at the forward end, or the hood is made of two similar parts.

In the form of the tester shown in Figure 1, there may be used a panel 60, being a rectangular metal sheet, adapted to bear any desired legend. The panel may be formed at one end with a flange 61 to be bolted to the bracket 48, and may carry at the other end legs 62 having suction cups 64 which will press down or collapse against the hood. With this arrangement, not only will the panel be held in position, but it will help to hold the burette in operative position when the hood is raised. If no necessity arises for the use of a panel, it may be removed and replaced by a bracket 66 carrying a suction cup 68, which when collapsed against the hood, operates to hold the burette securely in operative position when the hood is raised.

In the form shown in Figure 1, where the device is operated by remote control, that is, where the burette 13 is mounted on the hood while the control valve is operable from within the automobile, there is interposed in the length of the conduit 18 two parallel metal tubes 60A and 61A adapted to project into the inside of the automobile and connect to the control valve 63, the valve being suitably secured to the dash.

The valve 63 has been specially designed, and is shown in Figure 6. The valve as shown comprises a body 65 having ports 66 and 67 into which are received the adjacent ends of the tubes 61A and 60A, respectively. A third port 68A, communicating with the port 67, may be provided to receive one end of a tube 82 connected to the windshield wiper, so that the wiper may be operated at all times from manifold suction in the usual manner, independently of the operation of the tester. A metering orifice 70 leads from the port or passage 68A to a bore 69 which in turn communicates with the port 66. The bore 69 is threaded to receive the threaded stem 74 of the valve, the valve being adapted to engage with a seat 72 to seal the passage or port 67 from the passage or port 66. A vent or bleed 71 is made through the valve body to open into the bore 69 above the valve seat 72, but below the threads and below the metering orifice 70. The orifice 70 passes through the threaded portion of the bore 69, but opens into the bore preferably at a point which is at a level close to the level of the vent 71. In practice, the distance as measured along the axis of the bore, between the orifice and vent, is about one-eighth of an inch. The threaded portion of the valve stem is such that it allows air to seep or leak between it and the threaded wall of the bore, and thus maintains restrained communication between the vent 71 and the port 67. The valve body is provided with a threaded portion 80 adapted to receive a gland nut 76. The nut is formed to receive a washer 77 and packing 78.

When the valve is properly seated or closed, the port 66 is sealed from the atmosphere as well as from the port 67, while the port 67 is in restricted communication with the atmosphere. This is the position assumed by the valve, namely, seated or closed, when the tester is not being used for testing purposes. As fuel is sucked into the fuel pump from the tank, fuel is syphoned into the burette.

When the valve is unseated or open, suction or vacuum obtaining in the manifold is communicated to both the vent 71 and the port 66. In order to evacuate air from the top of the burette to fill the same completely with fuel, preparatory to the running of a test, the vent 71 is closed as with one finger, or else the valve raised until the threaded portion 74 of the stem 73 lies above the orifice 70. When the level of the fuel in the burette has risen above the upper mark or ring 26, the finger is removed from the vent 71, or the valve lowered until the threaded portion of the stem closes the vent 70 but the valve is clear of the valve seat 72, and the tester is now ready to be used for testing purposes. The fuel in the burette now will be gradually sucked into the pump, the suction in the manifold, or the receding level of fuel in the burette, now being ineffective to syphon fuel into the burette from the fuel tank. The vent 71, the metering orifice 70 and the clearance or leakage between the threaded portion of the valve stem and the threaded portion of the bore must be accordingly calibrated.

If, by inadvertence, the level of the fuel admitted into the burette, preparatory to the running of a test, is allowed to rise into the port 66 and as far up as the valve, only an attenuated or restricted flow will be sucked into the manifold, thus protecting the engine against flooding.

The valve may be assembled to the dash by a suitable bolt 86 passed through an aperture 80A made through the valve body.

In the form of the tester shown in Figure 2, the burette is mounted inside of the automobile, and accordingly, the valve 63A may be conveniently made part of the burette. The burette 13A has its upper cup 28A so made as to embody or include the valve. The burette may be secured to a bracket 48A comprising two portions 49A and 87. The burette bracket 48A is secured to a mounting bracket 66A with bolts 89A, and the bracket 66A is secured to the instrument panel as with bolts 88. In order to adjustably secure the bracket to the instrument panel, a plurality of apertures 90A may be provided. The upright leg of the member 86A of the bracket may also be provided with a plurality of apertures in order to vertically adjust the member 66A to the burette bracket 48A.

As shown, the member 87, upon which the lower cup 30 is supported, may be formed with a horizontal portion 49A to which the cup or valve 28A is secured, as with screws 60A. U-shaped members 90 are preferably provided as shown, to serve as guards or protective members for the burette. Fixed to the bracket 48A in its vertical portion is a rubber pad 91 to protect the paint on the instrument panel.

The upper cup 28A is formed substantially the same as the cup 28, and has a central recess 43A. In the cup is a threaded bushing 95 in which is received the threaded portion 74A of the valve stem 73A. A suitable packing gland 76A is threaded on the end of the bushing. The valve stem is formed with a valve adapted to engage or seat on a valve seat 72A. A metering vent 71A is drilled through the cup and the bushing, the vent opening into the bushing or bore above the valve seat but below a metering orifice 70A. A channel or port 67A is drilled through the cup and the bushing, and from this port extends the metering orifice 70A which opens into the bore of the bushing. The port 67A receives one end of the metal tube 18A of the conduit 18 from the manifold. A second port 98 is drilled through the cup and communicates with the recess 43A, this port receiving one end of the metal tube 17A of the conduit 17 from the fuel tank. As in the case of the valve 63, used in the form of the tester shown in Figure 1, the threaded portion 74A of the valve stem is such that air will seep or leak to the port 67A from the vent 71A, the vent 71A, orifice 70A and clearance or leakage between the threaded portion of the valve stem and bore being suitably calibrated.

In the length of the conduit 18 may be interposed a metal T 18B from which a rubber tube (not shown) may be connected to the windshield wiper, so that the wiper may be operated from manifold suction, independently of the operation of the tester.

In between tests, the valve 63, or 63A, as the case may be, is closed. Fuel in the burette is sucked into the fuel pump, and fuel from the fuel tank is thus syphoned into the top of the burette. When a test is to be made, the control valve is operated or slightly open, while the vent 71 or 71A, as the case may be, is closed with one finger, or the valve raised above the orifices 70, or 70A, as the case may be. Suction from the manifold will evacuate the air from the burette, with the result that fuel will be induced into the burette from the fuel tank. When the fuel has reached a level beyond the upper mark 26 on the burette, the finger is removed from the vent, or the valve lowered to a point below the orifice 70A, but clear of the valve seat, as the case may be. With the vent so open, air will be induced into the burette from the atmosphere and fuel will no longer be syphoned into the burette. Fuel will now feed to the fuel pump in accordance with the requirements of the engine. When the level of the fuel in the burette has fallen below the lower mark 26 on the burette, the test is completed.

I claim:

1. In a fuel consumption tester for automobiles and the like, the combination of a burette, a suction manifold, and conduit means between a top portion of said burette and said manifold for subjecting said burette to suction obtaining in said manifold, said conduit means including a valve body having a bore, a port from said bore, a metering orifice opening into said bore, said port, bore and orifice forming a continuous passage in the effective length of said conduit means, a valve seat between said port and said orifice, a vent to atmosphere in said body opening into said bore between said seat and said orifice, and a valve member in said bore operable to engage said seat to close said port, said bore and said valve member being adapted to provide leakage therebetween whereby restricted communication between said vent and said orifice obtains when said valve member engages said seat to close said port.

2. In a fuel consumption tester for automobiles and the like, the combination with a fuel pump, a fuel tank, and a suction manifold, of a tester including a burette mounted on the automobile at a level higher than said pump, conduit means between said tank and a top portion of said burette, conduit means between a bottom portion of said burette and said pump, and conduit means between a top portion of said burette and said manifold, said last mentioned conduit means including a valve body having a bore, a port opening into said bore, a metering orifice opening into said bore at a point spaced from said port, a valve seat between said port and said orifice, a vent to atmosphere opening into said bore between said valve seat and said orifice, said port and said orifice being operatively connected to adjacent ends, respectively, of said last mentioned conduit means, and a valve member in said bore operable to engage said seat to close said port from said bore, said bore and said valve member being adapted to provide leakage therebetween whereby said vent and said orifice are in restricted communication at all times.

3. In a fuel consumption tester for automobiles and the like, in combination with a fuel pump, a fuel tank, and a suction manifold, a burette, conduit means between a bottom portion of said burette and said pump, conduit means between a top portion of said burette and said tank, and conduit means between a top portion of said burette and said manifold, said last-mentioned conduit means including a valve body having a channel comprised of a bore, a metering orifice opening into said bore and a port opening into said bore, said channel being included in and forming part of said last mentioned conduit means, a valve seat in said bore between said port and said orifice, a vent to atmosphere through said body opening into said bore between said seat and said orifice, and a valve member in said bore operable to engage with said seat to close said port, said bore and said valve member being adapted to provide leakage therebetween whereby said vent and said orifice are in restricted communication at all times.

4. In a fuel consumption tester for automobiles and the like adapted to be removably held in operative position above the hinged hood of the vehicle in front of the windshield, a burette having a substantially rigid tube extending downwardly from the top of said burette, said tube being so formed intermediate its length as to present a bent portion below said burette adapted to clear an edge of the hood, and to present an end portion under the hood and above the cowl, and a substantially rigid tube extending downwardly from the bottom of said burette and operatively connected thereto to be bodily rotatable with respect to said burette on an axis substantially parallel with the longitudinal axis of said burette, said last-mentioned tube being so formed intermediate its length as to present a bent portion adapted to clear said edge, and to present an end portion under the hood and above the cowl, whereby said tubes may be clamped between the hood and cowl and friction-held in position with the burette lying above the hood when the same is in closed position.

5. In a fuel consumption tester for automobiles and the like adapted to be removably held in operative position above the hinged hood of the vehicle in front of the windshield, a burette having a substantially rigid tube extending downwardly from the top of said burette, said tube being so formed intermediate its length as to present a bent portion below said burette adapted to clear an edge of the hood, and to present an end portion under the hood and above the cowl, and a substantially rigid tube extending downwardly from the bottom of said burette, so formed intermediate its length as to present a bent portion under the hood and above the cowl, whereby said tubes may be clamped between the hood and cowl and friction-held in position with the burette lying above the hood when the same is in closed position.

6. In a fuel consumption tester for automobiles and the like adapted to be removably held in operative position above the hinged hood of the vehicle, a burette having a substantially rigid tube extending downwardly from a top portion of said burette, said tube being so formed as to present a portion below the hood and above the cowl, and a substantially rigid tube extending downwardly from a bottom portion of said burette and so formed as to present a portion below the hood and above the cowl, whereby said burette may be held in operative position by clamping the portions of said tubes between the cowl and the hood when closed.

7. In combination with an automobile and the like having a hinged hood and a cowl against which said hood closes, a fuel tank, a manifold, and a fuel pump; a tester comprising a burette, conduit means between a bottom portion of said burette and said pump whereby fuel in said burette may be sucked into said pump, a second conduit means between a top portion of said burette and said tank whereby fuel from said tank may be syphoned into said burette, a third conduit means between a top portion of said burette and said manifold whereby air in said burette may be evacuated to cause fuel to be sucked into said burette from said tank, at least two of said conduit means including substantially rigid tubes extending downwardly from said burette clamped between said hood and said cowl, said tubes being so formed as to hold said burette in operative position above said hood, said third conduit means having interposed in the length thereof two unconnected tubes extending into the automobile, and a control valve connected to the adjacent, unconnected ends of said last mentioned tubes whereby the operation of said tester may be controlled from within said automobile while said burette is in sight of the operator.

8. In a fuel consumption tester for automobiles and the like, the combination of a burette, a fuel pump operatively connected to a bottom portion of said burette to receive fuel from said burette, a fuel tank operatively connected to a top portion of said burette so that fuel may be syphoned into said burette by the evacuation of fuel from said burette into said pump, a suction manifold, and conduit means between said manifold and a top portion of said burette, said conduit means having means to control the effect of manifold suction on the suction obtaining in said burette comprising a valve body having a bore, a port from said bore, a metering orifice opeing into said bore, said port, bore and orifice forming a continuous passage in the effective length of said conduit means, a valve seat in said bore between said port and said orifice, a vent to atmosphere opening into said bore between said seat and said orifice, and a valve member operable in said bore having a portion engageable with said seat to close said port, said bore and valve member being adapted to provide leakage between said bore and said valve member whereby said manifold is in at least restricted communication with the atmosphere at all times irrespective of the position of said valve member in said bore.

9. In a fuel consumption tester for automobiles and the like, the combination of a burette, a fuel pump operatively connected to a bottom portion of said burette to receive fuel from said burette, a fuel tank operatively connected to a top portion of said burette so that fuel may be syphoned into said burette by the evacuation of fuel from said burette into said pump, a suction manifold, and conduit means between said manifold and a top portion of said burette, said conduit means having interposed in the effective length thereof means for controlling the effect of manifold suction on the suction in said burette comprising a valve body having a bore, a port opening into said bore, a metering orifice opening into said bore, said bore, port and orifice forming a continuous passage in the effective length of said conduit means, a valve seat in said bore between said port and said orifice, a vent to atmosphere opening into said bore between said seat and said orifice, and a valve member in said bore movable in one direction to engage said seat and close said port from said vent and movable in an opposite direction to open said port to said vent and to open said vent and said port to said orifice.

10. In a tester, the combination of a hinged hood and a cowl against which said hood closes, a burette, a plurality of substantially rigid tubes extending downwardly from said burette and clamped between said hood and cowl to support said burette in operative position above said hood, said tubes being so formed as to hold said burette in a substantially vertical operative position, a member fixed to said burette and having a portion extending laterally of the longitudinal axis of said burette to overlie the hood when the tester is in operative position, said laterally-extending portion having a suction cup adapted to be pressed against the hood whereby to provide means for removably securing the tester in operative position to the vehicle when the hood is open.

11. In a tester, the combination of a hinged hood and a cowl against which said hood closes, a burette, a plurality of substantially rigid tubes extending downwardly from said burette and clamped between said hood and cowl to support said burette in operative position above said hood, said tubes being so formed as to hold said burette in a substantially vertical operative position, a bracket fixed to said burette, a panel removably secured to said bracket and adapted to overlie the hood when the tester is in operative position, said panel having a suction cup for removably securing the same to the hood, whereby to provide means for removably securing the tester in operative position to the vehicle when the hood is open.

DONAT A. GAUTHIER.